M. W. SMITH.
CASH REGISTERING TILL.
APPLICATION FILED SEPT. 9, 1905.

913,779.

Patented Mar. 2, 1909.
5 SHEETS—SHEET 1.

WITNESSES:

INVENTOR
Maurice William Smith,
By his Attorneys

M. W. SMITH.
CASH REGISTERING TILL.
APPLICATION FILED SEPT. 9, 1905.

913,779.

Patented Mar. 2, 1909.
5 SHEETS—SHEET 2.

WITNESSES:
Fred White
René Buine

INVENTOR:
Maurice William Smith,
By his Attorneys
Arthur E. Fraser & Co.

M. W. SMITH.
CASH REGISTERING TILL.
APPLICATION FILED SEPT. 9, 1905.
913,779.
Patented Mar. 2, 1909.
5 SHEETS—SHEET 3.
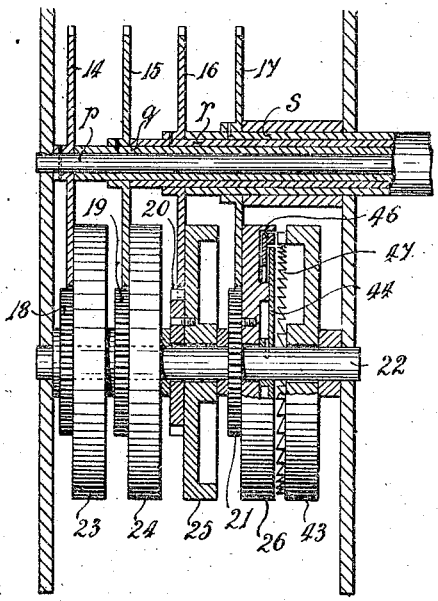
Fig. 6.
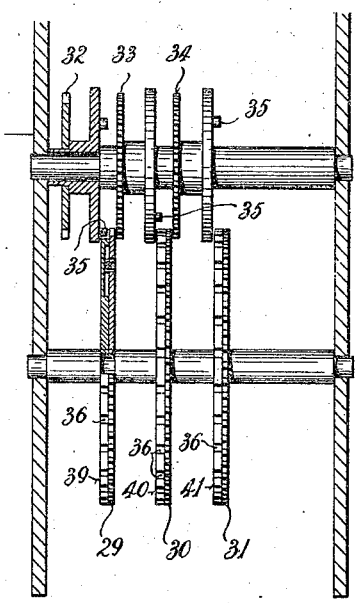
Fig. 7.
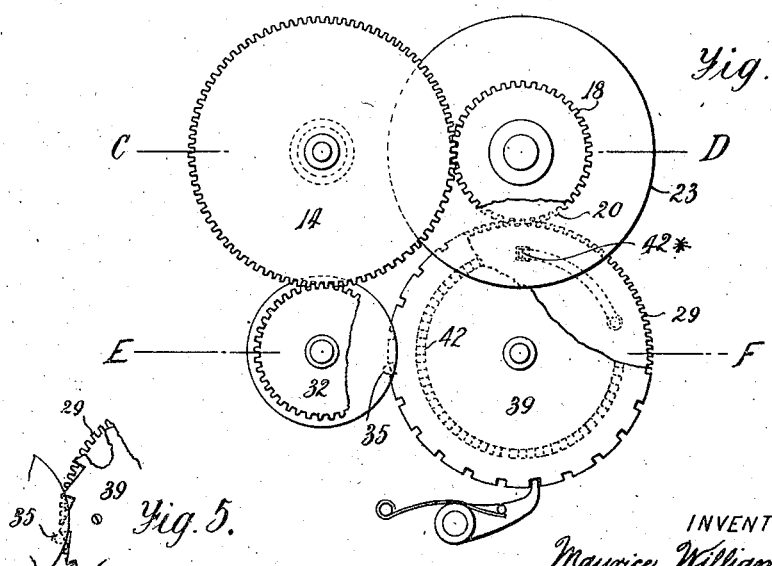
Fig. 4.
Fig. 5.
WITNESSES
Fred White
Rene Bruine
INVENTOR:
Maurice William Smith,
By his Attorneys
Arthur E. Fraser & Co.

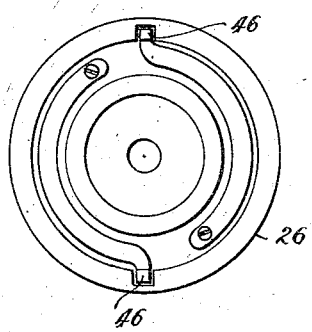
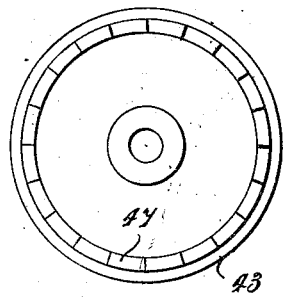
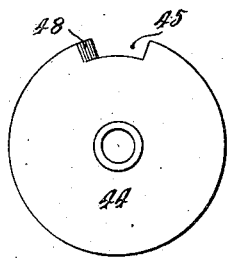
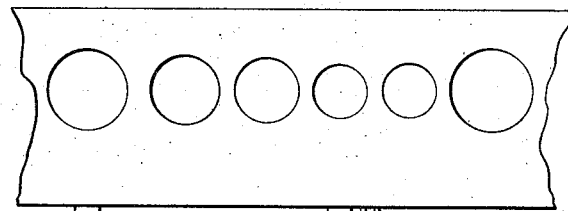

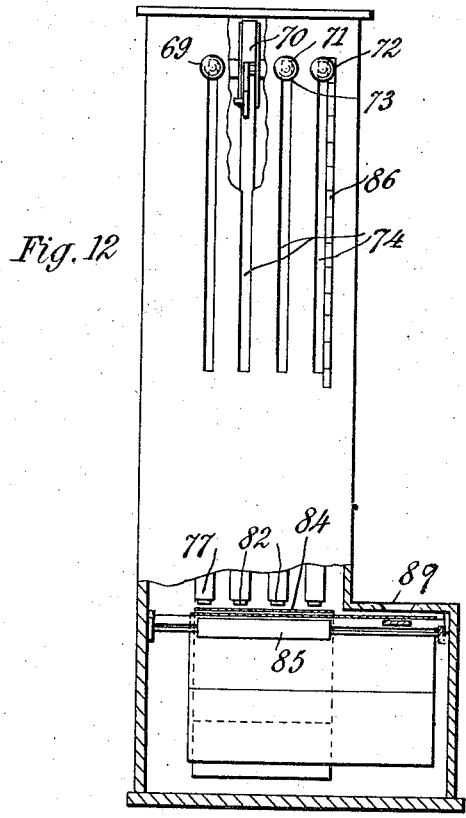
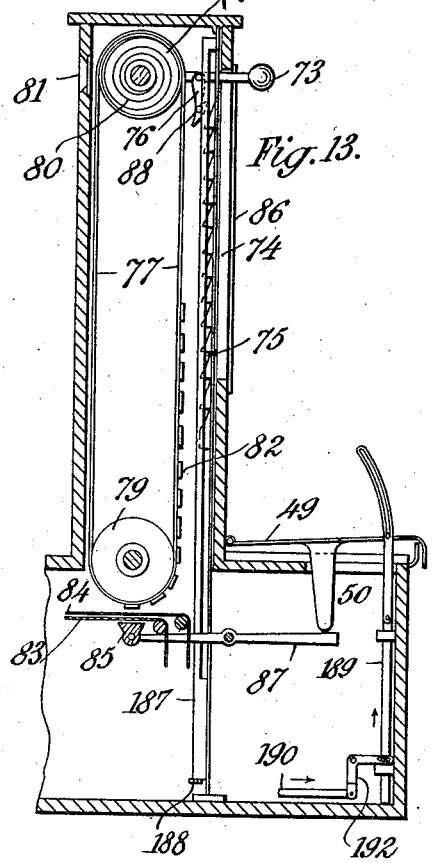
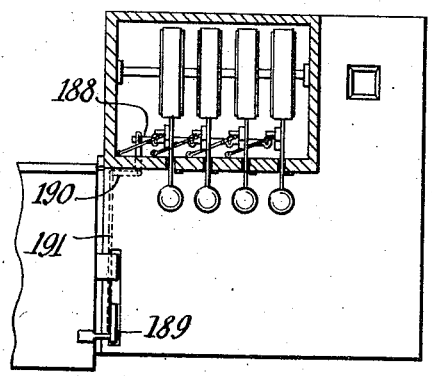
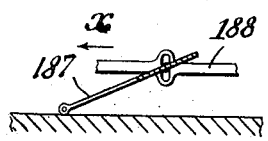

UNITED STATES PATENT OFFICE.

MAURICE WILLIAM SMITH, OF HODDESDON, ENGLAND.

CASH-REGISTERING TILL.

No. 913,779.         Specification of Letters Patent.         Patented March 2, 1909.

Application filed September 9, 1905. Serial No. 277,669.

*To all whom it may concern:*

Be it known that I, MAURICE WILLIAM SMITH, of Lynhurst, Hoddesdon, in the county of Herts, England, have invented certain new and useful Improvements in or Relating to Cash-Registering Tills, of which the following is a specification.

This invention relates to cash registering tills and has for its object to provide an effective form of apparatus for recording the insertion and withdrawal of coins for automatically compiling the successive records, mechanism being also provided for indicating to the purchaser the amount of the purchase.

According to this invention the coins of different value are stored separately in tubes or hoppers, and the act of inserting a coin records such insertion and the act of removing a coin effects a record of such removal and the sum total may be either obtained by employing the compiling mechanism or by a comparison of the sum of the coins placed in the hopper with the sum of the coins removed, in the last case the difference will indicate the amount received.

In describing my invention I will refer to the accompanying drawings:—

Figure 1:
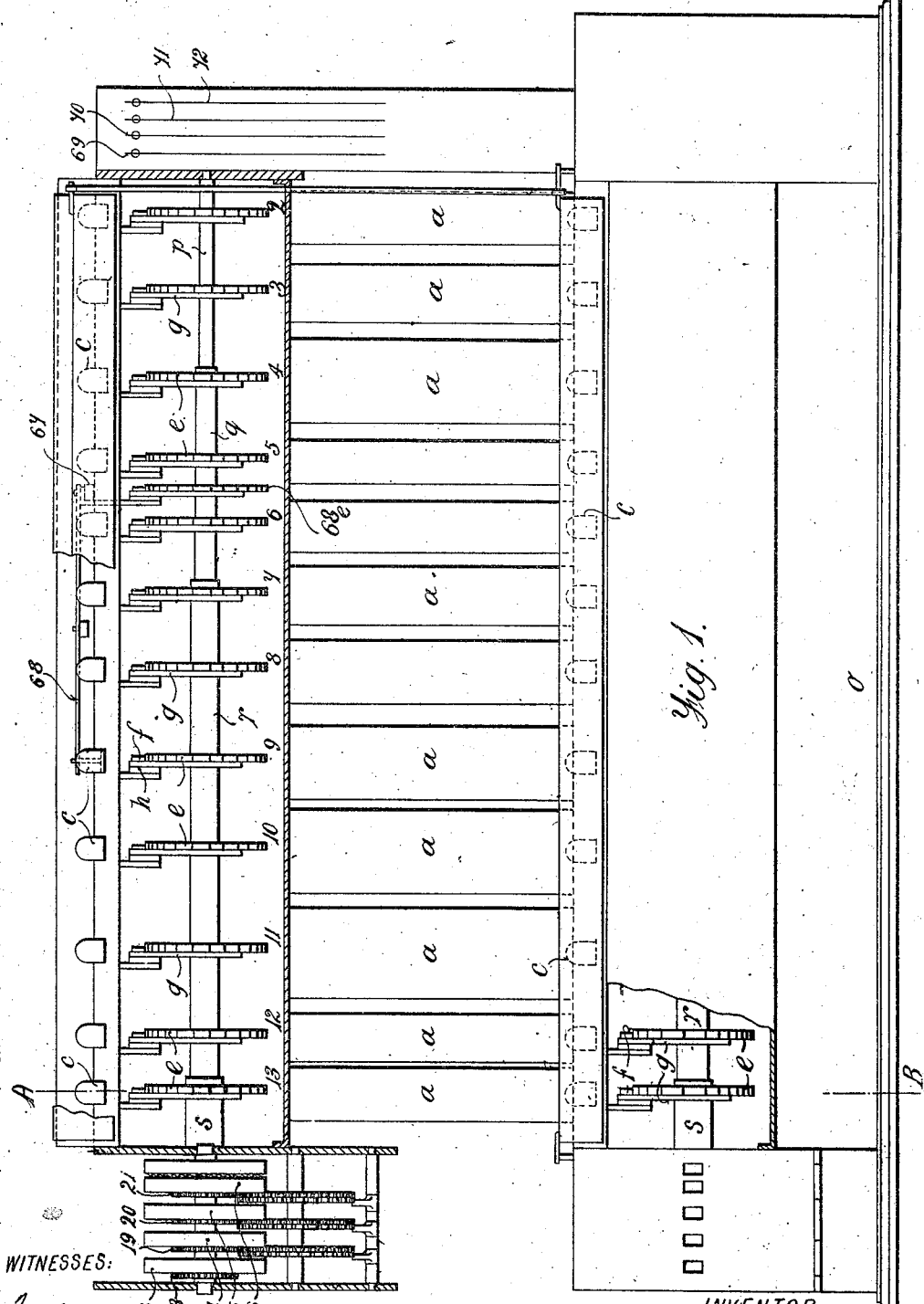
Figure 3:
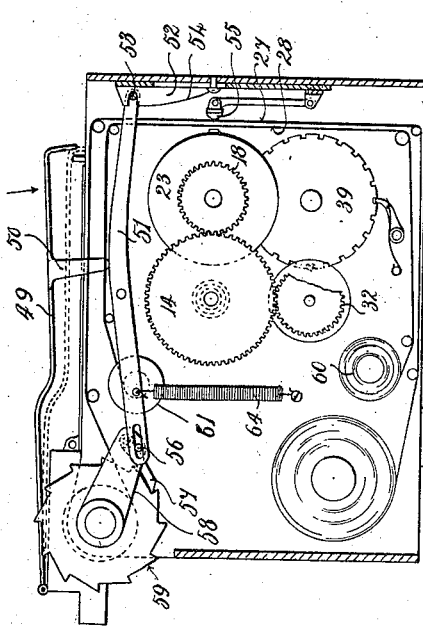
Figure 3:
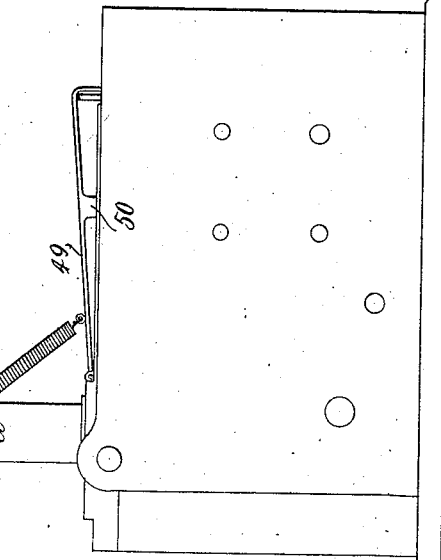
Figure 3A:
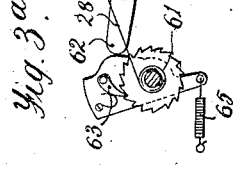
Figure 2:
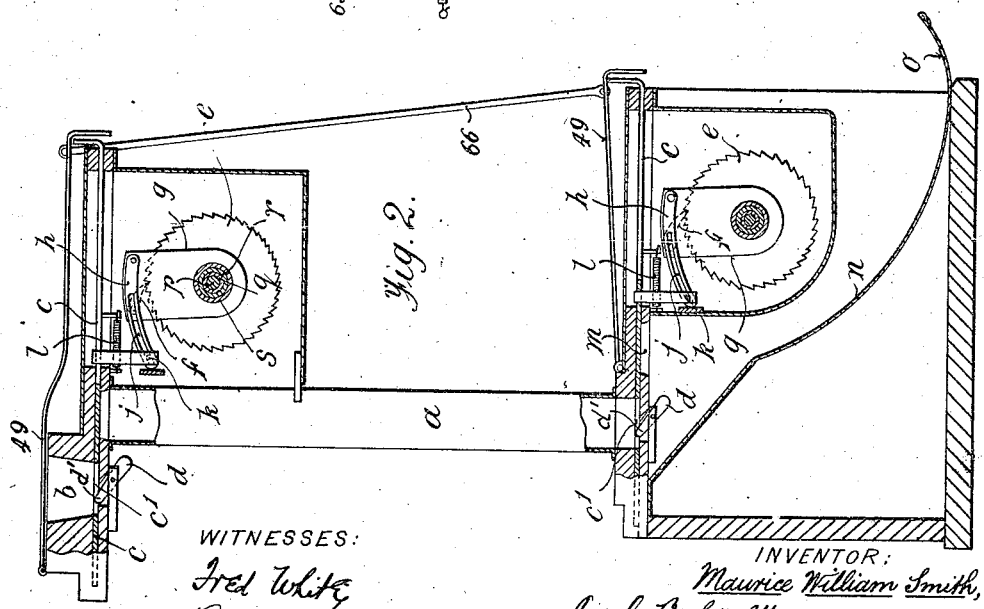

Figure 1 is a front elevation of a complete apparatus with part of the casing in section. Fig. 2 is a section of Fig. 1 on the line A—B. Fig. 3 is an end elevation with the casing removed. Fig. 3ª is a detail. Fig. 4 is an enlarged end elevation of the recording mechanism shown to the left in Fig. 1. Fig. 5 is a detail of a modified construction. Fig. 6 is a section on line C—D Fig. 4. Fig. 7 is a section on line E—F of Fig. 4. Figs. 8, 9 and 10 are details of the last element of the recording train of wheels shown in Figs. 5, 6 and 7. Fig. 11 illustrates means which are combined with the apparatus where it is required to record coins consisting of odd amounts such as an English half-crown. Fig. 12 is a front elevation of the mechanism for indicating the amount of the purchase to the customer and which is shown at the right of Fig. 1. Fig. 13 is a sectional end elevation of one of the elements of the mechanism shown in Fig. 12. Figs. 14 and 15 are details.

*a* are the coin tubes arranged vertically (although this is not necessary).

*b b* are the coin receiving apertures in which the coins are placed and the bases of which apertures are out of alinement with the tubes *a*.

In the further description only one tube and its attachments will be referred to for the sake of clearness.

*c* is a slide having a hole *c'* in the base of the aperture *b* so that the coin placed therein will lie in the hole of said slide in such manner that when the slide is pulled outward in the direction of the tube *a* the coin will be drawn together with the slide until it reaches the tube *a* when it will fall thereinto; the coin aperture *b* is made of a suitable depth preferably slightly conical so that several coins can be placed therein at one time but only the lowermost coin will be removed into the tube *a* at each operation of the slide.

For preventing operation of the slides *c* when no coins are present in the tube *a* or aperture *b*, a counterbalanced catch *d* is provided having a nose *d'* which is so disposed in the path of the slide *c* as to engage the wall of the hole *c'*. When however coins are placed in the tube *a* or aperture *b* the catch is depressed and the slides are free to be drawn out. This obviates a record being made without the insertion of a coin. Each reciprocation of the coin slide *c* rotates a ratchet wheel *e* through the medium of a pawl *f* and thereby records the insertion of the coin into the particular tube to which the coin slide belongs. The movement of each slide *c* is equal but in order that the coins of different value may record their respective value, the slide is allowed to have in some cases a greater or less initial movement before operating the ratchet wheel *e*. For instance as shown in Fig. 2 it will be seen that the pawl *f* is mounted on a plate *g* which is rotatably mounted with the wheel *e* but free therefrom and this plate has an extended slotted arm *h* pivoted to the plate *g* and in the slot *j* of which rides a pin *k* carried by the slide *c*, whereby on the outward movement of the slide *c* the pin *k* will have a free inoperative movement in the slot *j* of the arm which turns on its pivot to allow of the horizontal motion of the pin *k*. On the pin *k* reaching the end of the slot *j* it will turn the plate *g* with pawl *f* and so turn the wheel *e* the required distance corresponding to the value of the respective coins. The slide *c* and parts connected thereto are returned to normal position by a spring such as *l*. This varying travel of the different wheels *e* is necessary in view of the different fractions of any particular denomination of coin. For instance a penny is divided into four values (¼, ½, ¾ and 1d) and as these are all recorded upon the same mechanism i. e., the pence recording mechanism it will be seen that the wheels corresponding to the above values must have different degrees of movement.

The lower ends of the coin receiving tubes are fitted with corresponding slides and recording mechanism to that just described. This will be clearly seen from Fig. 2 where similar letters of reference are employed for both mechanisms. It will be noted however that the initial position of the slide c in Fig. 2 is with its hole c' at the base of the coin tube a while when withdrawn the slide delivers the coin which is slid with it through a hole m beneath in the casing which is formed in the manner of a chute n which delivers the discharge coin to a convenient spot as at o from which the operator can conveniently gather the coins.

The series of ratchet wheels shown clearly in Fig. 1 which are actuated by corresponding series of slides c serve to actuate a series of shafts or sleeves arranged concentrically with one another, each shaft p q r s carries one or more of the ratchet wheels e according to the coinage for which the series of shafts are arranged. Each shaft carries ratchet wheels which correspond to those coins which represent fractions of the coin on the first wheel on the next shaft, for instance the wheels 2 and 3 represent the fraction of the wheel 4 on the next shaft q while the wheels 4, 5 and 6 represent fractions of the wheel 7 on the shaft r and so on throughout the series up to the wheel 13. Each of the shafts p q r s operates separate toothed wheels 14, 15, 16 and 17 fixed on their respective ends and engaging with other wheels 18, 19, 20 and 21 free to rotate on fixed shaft 22. Said wheels 18, 19 20 and 21 are each attached to and rotate with printing drums 23, 24, 25, and 26 which printing wheels have type suitably formed or carried on their periphery adapted to print a record on a recording strip 27 through the medium of an ink ribbon 28 (see Fig. 3) which will be hereinafter referred to. The pinions 19, 20 and 21 engage with gear wheels 29, 30 and 31 in such manner that, say at one operation of the apparatus the coin representing the unit of the wheel 16 is inserted in the slide c corresponding with the ratchet wheel 7; this will effect a movement of the wheel 16, the printing drum 25 through the pinion 20, and the drum 25 will be moved a distance corresponding to said unit. Should now at the same operation a fraction of said unit wheel 7 be inserted in the slide c corresponding to the wheel 6 on shaft q said operation will move the wheel 15 and through it move the drum 24 a distance sufficient to indicate said fraction, and this fractional movement of the drum 24 will by engagement with the pinion 33 of the series 32, 33, 34 move the same a corresponding distance whereby by the successive movements of the fractions and units a pin 35 carried by the pinion 33 of the series 32, 33, and 34 will engage one of a series of notches 36 in the periphery of the disk 40 of the series 39, 40 41 which drives the pinion 20 of the series 18, 19, 20, 21 through the medium of the gear wheel 30 of the series 29 to 31 which wheel 30 is coupled to the disk 40 by one direction clutch mechanism consisting of a ring of ratchet teeth 42 upon the disks 39, 40, 41 and a spring pressed pawl 42* upon the toothed wheels 29, 30 and 31. This arrangement permits the wheel 20 to rotate with its drum 25 independently of the notched disk 40 when actuated direct from the wheels, 14, 15, 16 or 17. At the same time as soon as the pin 35 engages the notches on the wheel 40 the ratchet connection permits the motion being conveyed to the wheels 25 in addition to and independently of the motion which the said wheel receives from the concentric shafts by their direct connection. If required the adjacent notched wheels 39, 40 41 and a spur wheel of 29 to 31 may be fixed together as shown in Fig. 5, in which case the notches should be in the form of deep ratchet teeth so that the pins on the pinions may easily pass into and out of engagement therewith. Although the arrangement shown in Fig. 4 allows of extreme accuracy in working it will generally be preferable to employ the arrangement shown in Fig. 5. A different arrangement is adopted in the last two elements of the train of wheels where I employ the arrangement shown in Fig. 6 and in detail in Figs. 8, 9 and 10 where the printing disk 26 and a further printing disk 43 are adjacent thereto on the same shaft but moving independently are separated by a shield or plate 44 fixed upon the fixed shaft 22. This shield is provided with a gap or hole 45 at one part of its periphery and the wheel 26 is provided with a pair of latches 46, 46, which on coming opposite to said gap, 45 in the shield 44 pass therethrough into engagement with ratchet teeth 47 upon the drum 43 and drives the same for a certain distance determined by the length of the gap 45 one end of which is formed with a suitable incline 48 adapted to press upon the latch 46, and withdraw same from engagement with the wheel 43 as the printing drum 26 rotates. This mechanism has a similar operation to the mechanism described in Fig. in that it allows the drum 26 to be operated separately by its corresponding mechanism representing fractions of the wheel 43 until on the completion of a half revolution the latches acting as described add a unit value of half the wheel 26 to the total wheel 43. It will thus be seen that whatever number of slides c are successively operated in respect of one transaction the movements of each are transmitted to the respective printing drums 23 to 26 and at the conclusion of the transaction a print is taken of the position of said drums, this being effected by the mechanism shown in Fig. 3 in which it will be seen that the printing drum is placed adjacent to a printing ribbon 28 and a traveling record strip 27.

In order to effect the printing operation and to travel the recording strip one movement at each operation and also travel the printing tape if required, the apparatus is provided with a hinged cover 49 which when closed covers the slides $c$ and prevents their being operated until the cover 49 is raised. The opening of the cover is effected by suitable springs released by the assistant preparatory to recording a transaction. As soon as the cover is released and raised, the slides can be operated and the downward movement of the cover which is effected by the assistant after the transaction, effects the beforementioned printing operation, by means of a projection 50. This projection 50 depresses a lever 51, which effects the printing operation by depressing a slide 52 with which it is pivotally connected at 53. This slide 52 is provided with a cam surface 54 the downward movement of which engages the printing pad 55, which depresses both the record strip 27 and the printing ribbon 28 upon the printing drums 23 to 26 and 43. The ribbon and strip are made sufficiently wide to cover all the said drums and obtain a record of the position of each. When the cover 49 is raised the parts move to the position shown in Fig. 3 and in so doing the other end of the lever 51 through the medium of pin and slot connection 56 and a pawl 57 mounted on a rocking arm 58 actuates a ratchet wheel 59 suitably coupled to the winding drum upon which the recording strip is wound. By similar mechanism not illustrated in Fig. 3 but shown in Fig. 3ª the printing ribbon 28 is suitably traveled from a drum 60 on to a drum 61. It will be seen that this mechanism consists of a nose 62 on the lever 51 which operates at the same time as the pawl 57 to rotate a ratchet wheel on the drum 61 through the medium of another pawl 63. Suitable return springs are provided when required as at 64, 65.

As previously mentioned the mechanism for recording the withdrawal of the coins is almost identical with the mechanism for recording the coins inserted and in order that the records of each may be moved and recorded simultaneously the covers 49 of each mechanism are coupled by link 66 whereby the raising and lowering of each cover serves to operate the other and the corresponding mechanism connected therewith. As in some cases where it is necessary to record a coin such as the English half-crown it is necessary that the odd amount should be recorded separately on its corresponding mechanism and for this purpose I employ the arrangement shown in Fig. 11. In this case the wheel 9 is adapted to be rotated by its slide $c$ for a distance equal to that of the two shillings wheel 8 and the extra sixpence is recorded by means of additional wheel $68^e$ disposed adjacent to and on the same shaft as the sixpenny wheel 6. This additional wheel $68^e$ is operated by a slide 67 coupled by a pivoted lever 68 to the slide $c$ of the two shillings sixpence tube whereby when the slide $c$ is drawn out to record two shillings on the shaft $r$ the lever 68 moves inoperatively, but on the return movement of such slide the pivoted lever 68 actuates the wheel $68^e$ and records sixpence on the shaft $q$. Thus a simultaneous or overlapping record is obviated.

As regards the mechanism for indicating the amount of the purchase to the purchaser and for receiving the signature of the attendant whereby he can be identified with the particular transaction. This mechanism is shown in Figs. 12 to 15 consisting of a number of corresponding devices 69, 70, 71 and 72 only one of which will be referred to for the sake of clearness. Each such mechanism comprises a knob 73 sliding in slot 74 within which is disposed a ratchet rack 75 engaged by springs or weighted pawl 76 carried by the knob 73. This said knob 73 is attached to an endless band 77 mounted on two drums 78, 79 so as to be traveled thereover when the knob 73 is moved up and down in the slot and the knob is always returned to normal position by means of a spring 80 in the drum 78 when the pawl 76 is released from engagement with the rack 75. The front face of the band which is exhibited to the purchaser through a suitable window 81, is provided with a series of figures indicating the various amounts of the coinage for which the machine is designed, there being one band for each group of coins. The other side of the band is provided with printing characters 82 spaced correspondingly to the characters on the other face of the band and these raised characters are adapted to come in position above a recording strip 83 and a printing ribbon 84 disposed above a printing pad 85 similar to that shown in Fig. 3. The recording strip 83 also passes beneath a suitable aperture over a suitable supporting tablet which allows of the assistant writing his signature thereon when the transaction is completed, the operation being as follows:—

Before the coins have been inserted and withdrawn for the purpose of receiving the money and giving the change, the assistant proceeds to operate the mechanism shown in Figs. 12 and 13 by pressing down the respective knobs 73 which will bring to the window 81 that part of the band which shows the amount of the purchase. It may be necessary to do this by operating one or more of the knobs 73 to show the amount of the various groups of coins. To do this effectively from the back of the apparatus, the slots 71 are provided with a suitable index 86 enabling the operator to quickly move the band to its required position. Each knob as it is depressed is retained in position by the pawl 76 and cannot be returned until released by the next opening movement of the covers 49 the printing being accomplished by the closing movement of the cover 49 through projection 50 and lever 87. In order that the purchase indicated by the band may remain exhibited until the next transaction the release of the band is effected by the upward movement of the covers 49 this being accomplished by connecting said covers to a series of flaps or hinged strips 187 disposed throughout the whole length of the slots 74 and shown in detail in Figs. 14 and 15, the movement of said flaps engaging pins 88 on the pawl 76 and moving same out of engagement of the rack 75 when the spring drum at once returns all the bands and knobs to zero. The flaps 187 are coupled to a slotted bar 188 (Fig. 15) which bar is in turn connected to a vertical rod 189 by means of a bell crank 190, link 191 and bell crank 192. The upper end of the rod 189 is provided with a curved slot in which a pin upon the cover slides (see Fig. 13).

The operation is as follows:—When it is desired to return the pawls to zero, prior to indicating and recording the entire transaction, the cover is raised and when the pin reaches the end of the slot in the rod 189 the continued upward movement of the cover serves to raise the vertical rod, which movement, through the link 191 and bell crank levers 190 and 192, causes the slotted bar 188 to move in the direction of the arrow $x$, thus moving the hinged slots outwardly whereby the edges of same engage the pins on the pawls, and release same from engagement with the rack, whereupon the springs in the drums return the bands and knobs to zero. The subsequent closing of the cover 49 effects a movement of the printing pad 85 through suitable connecting lever 57. The recording strip 83 Figs. 12, 13, will be made wide enough to pass under a suitable aperture at the side of the casing as at 89 to enable the assistant to initial the strip and identify himself with the transaction.

What I claim is:—

1. In cash registering tills the combination of a series of slides having coin receiving apertures, a series of coin storing tubes, a slide having a delivery aperture at the opposite end of said coin storing tube, means for traveling the coins from the coin receiving aperture into the coin storing tubes and means for traveling the coins from the coin storing tubes to the delivery aperture, a series of concentric shafts one of which is operated at each movement of the means for traveling the coin from the coin receiving apertures into the coin storing tubes, a series of toothed wheels one on each of said shafts, a series of pinions carrying printing drums actuated by said toothed wheels a series of pinions mounted adjacent to said toothed wheels and operated thereby, wheels carrying pins and driven by said pinions notched wheels actuated by said pinwheels, toothed wheels mounted closely adjacent to said notched wheels and coupled together by one direction clutch mechanism so that the toothed wheel which directly drives the printing drum also drives the printing drum of next higher value at each complete revolution of the pin wheel.

2. In cash registering tills, the combination of a number of tubes corresponding to the number of denominations of the coins, means for inserting the coins into said tubes, means for withdrawing the coins from said tubes, and recording mechanism for recording the insertion and withdrawal of the coins comprising the combination of a series of concentric shafts each corresponding to a group of coins, means whereby said concentric shafts are separately operated, a series of toothed wheels upon said shafts, a series of printing drums driven by said toothed wheels, a series of pinions driven by said toothed wheels and carrying pins, a series of combined toothed and notched wheels the teeth thereon gearing with the pinions carrying the printing drum and the notched wheels being engaged by the pins on the pinions of the next lower value whereby a predetermined movement of any one pinion moves the printing drum of next higher value one step.

3. In cash registering tills, the combination of a number of tubes corresponding to the number of denominations of the coins, means for inserting the coins into said tubes, means for withdrawing the coins from said tubes, and recording mechanism for recording the insertion and withdrawal of the coins comprising the combination of a series of concentric shafts each corresponding to a group of coins, means whereby said concentric shafts are separately operated, a series of toothed wheels upon said shafts, a series of printing drums driven by said toothed wheels, a series of pinions driven by said toothed wheels and carrying pins, a series of notched disks and toothed wheels having ratchet engagement with one another, the toothed wheels gearing with the printing drums and the notched wheels being engaged by the pins on the pinions of the next lower value whereby a predetermined movement of any one pinion moves the printing drum of the next higher value one step.

4. In cash registering tills, the combination of a number of tubes corresponding to the number of denominations of the coins, means for inserting the coins into said tubes, means for withdrawing the coins from said tubes, and recording mechanism comprising the combination of a series of concentric shafts each corresponding to a group of coins, means whereby said concentric shafts are separately operated when coins are inserted, a second series of concentric shafts each corresponding to a group of coins, means whereby the concentric shafts of said second series are separately operated when coins are withdrawn, a series of toothed wheels upon said shafts, a series of printing drums driven by said toothed wheels, a series of pinions driven by said toothed wheels and carrying pins, a series of toothed wheels in engagement with the printing drums, a series of notched disks mounted adjacent to said toothed wheels, spring pressed pawls on the side faces of said toothed wheels, a ring of ratchet teeth on the adjacent face of each notched disk and adapted to engage said spring pawls and drive same when the corresponding notched disk is rotated but allowing free movement of the toothed wheels in regard to the notched disks in the reverse direction, the notches of the notched disk being engaged by the pins on the pinions at each predetermined movement thereof, the pinion which is driven from any particular shaft being adapted to engage the notched wheels which drive the drums of the next higher value to said shaft which drives the pinion.

5. In cash registering tills, the combination of a number of tubes corresponding to the number of denominations of the coins, means for inserting the coins into said tubes, means for withdrawing the coins from said tubes, and recording mechanism comprising the combination of two series of concentric shafts each corresponding to a group of coins, means whereby the concentric shafts of one series are separately operated when coins are inserted, means whereby the concentric shafts of the other series are separately operated when coins are withdrawn, a series of toothed wheels upon said shafts, a series of printing drums driven by said toothed wheels, a series of pinions driven by said toothed wheels and carrying pins, a series of notched disks and toothed wheels having ratchet engagement with one another, the toothed wheels gearing with the printing drum and the notched wheels being engaged by the pin on the pinion of next lower value whereby a predetermined movement of any one pinion moves the printing drum of the next higher value one step, a printing drum forming the final wheel of the series of the adding train of the wheels and coupled to the drum of next lower value by intermittently acting ratchet mechanism, substantially as and for the purpose set forth 6. In cash registering tills, the combination of a number of tubes corresponding to the number of denominations of the coins, means for inserting the coins into said tubes, means for withdrawing the coins from said tubes, and recording mechanism comprising the combination of two series of concentric shafts each corresponding to a group of coins, means whereby the concentric shafts of one series are separately operated when coins are inserted, means whereby the concentric shafts of the other series are separately operated when coins are withdrawn, a series of toothed wheels upon said shafts, a series of printing drums driven by said toothed wheels, a series of pinions driven by said toothed wheels and carrying pins, a series of notched disks and toothed wheels having a ratchet engagement with one another, the toothed wheels gearing with the printing drum and the notched wheels being engaged by the pinon the pinion of next lower value whereby a predetermined movement of any one pinion moves the printing drum of next higher value one step, a printing drum forming the final wheel of a series of recording wheels and disposed at the side of the drum of next lower value on the same shaft, a shield plate fixed to said shaft between said printing drums, a gap in said shield plate, a ring of ratchet teeth on said final drum and a spring latch on said printing drum of next lower value, said latch being disposed in the path of the gap in the shield plate and the path of the ring of ratchet teeth on the final drum, whereby the said latch on coming opposite the gap engages the ring of ratchet teeth and moves the final printing drum one step determined by the length of the gap, substantially as and for the purpose set forth.

7. In cash registering tills, the combination of a number of tubes corresponding to the number of denominations of the coins, means for inserting the coins into said tubes, means for withdrawing the coins from said tubes, and recording mechanism comprising the combination of two series of concentric shafts each corresponding to a group of coins, means whereby the concentric shafts of one series are separately operated when coins are inserted, means whereby the concentric shafts of the other series are separately operated when coins are withdrawn, means whereby the mechanism which operates any two concentric shafts is coupled for the purpose of operating the two shafts which together represent the value of a coin containing a fraction, a series of toothed wheels upon said shafts, a series of printing drums driven by said toothed wheels, a series of pinions driven by said toothed wheels and carrying pins, a series of notched disks and toothed wheels having ratchet engagement with one another, the toothed wheels gearing with the printing drum and the notched wheels being engaged by the pin on the pinion of next lower value whereby a predetermined movement of any one pinion moves the printing drum of next higher value one step.

8. In cash registering tills the combination of a part having coin receiving apertures, a series of coin storing tubes, a coin delivery aperture at the opposite end of said tube, means for traveling the coins from the coin receiving aperture into the coin receiving tube and means for traveling the coins from the coin receiving tubes to the delivery aperture, the series of concentric shafts one of which is operated at each movement of the means for traveling the coin from the coin receiving apertures into the coin receiving tubes, a series of toothed wheels one on each side of said shafts, a series of printing drums operated by said toothed wheel, a series of pinions mounted adjacent to said toothed wheels and operated thereby, pins on said pinions, toothed wheels engaging with and driving the printing drums in one direction only, means whereby the pins on the pinions operate the toothed wheel of the drum of next higher value at each complete revolution of the pinion whereby not only is the printing drum operated through the medium of its own shaft but is also operated by the pinion coupled to the shaft which represents the fraction of said printing drum, means whereby any two concentric shafts are operated simultaneously from that coin tube which represents a coin the sum of which contains a fraction.

9. In cash registering tills, the combination of a number of tubes corresponding to the number of denominations of the coins, means for inserting the coins into said tubes, means for withdrawing the coins from said tubes, and recording mechanism comprising the combination of two series of concentric shafts each corresponding to a group of coins, means whereby the concentric shafts of one series are separately operated when coins are inserted, means whereby the concentric shafts of the other series are separately operated when coins are withdrawn, a series of toothed wheels upon said shafts, a series of printing drums driven by said toothed wheels, a series of pinions driven by said toothed wheels and carrying pins, a series of notched disks and toothed wheels having ratchet engagement with one another, the toothed wheels gearing with the printing drum and the notched wheels being engaged by the pin on the pinion of next lower value whereby a predetermined movement of any one pinion moves the printing drum of next higher value one step, means whereby a print or record is taken of the drums after each transaction.

10. In cash registering tills, the combination of a number of tubes corresponding to the number of denominations of the coins, means for inserting the coins into the tubes, means for withdrawing the coins from the tubes, and recording mechanism comprising the combination of two series of concentric shafts each corresponding to a group of coins, means whereby the concentric shafts of one series are separately operated when coins are inserted, means whereby the concentric shafts of the other series are separately operated when coins are withdrawn, a series of toothed wheels upon said shafts, a series of printing drums driven by said toothed wheels, a series of pinions driven by said toothed wheels and carrying pins, a series of notched disks and toothed wheels having ratchet engagement with one another, the toothed wheels gearing with the printing drum and the notched wheels being engaged by the pin on the pinion of next lower value whereby a predetermined movement of any one pinion moves the printing drum of next higher value one step, means for taking a print from the printing drums after each transaction, a hinged flap covering the means for inserting and withdrawing coins and kept closed against spring action by a catch, a pivoted lever extended in the path of said hinged cover, a slide actuated by said pivoted lever, a printing pad pressed by the movement of said slide so as to carry the record strip and ink ribbon on to said printing drum for the purpose of obtaining a record, drums upon which said ink ribbon and record strip are wound, ratchet mechanism actuated by said pivoted lever to rotate said drums step by step for traveling the ribbon and record strip; substantially as described.

11. The improved cash registering till comprising the combination of a series of coin storing tubes having each a coin receiving aperture at its upper end out of alinement therewith, and a coin delivery aperture at its lower end, also out of alinement therewith, a series of slides having apertures normally corresponding with and adapted to receive coins from the coin receiving apertures and to travel the same by sliding movement to and deliver the coins into the coin storing tubes, a slide having an aperture normally in alinement with the base of a coin receiving tube and adapted to receive coins therefrom and to travel and discharge same, recording mechanism disposed one at the first mentioned series of slides and another at the last mentioned series of slides and operated thereby and comprising a series of pawls operated by said slides, a series of ratchet wheels operated by said pawls, means for allowing a greater or less initial movement of the slides, before operating the ratchet wheels, a series of concentric shafts, each concentric shaft carrying a number of said ratchet wheels which represent a group of coins, a series of toothed wheels on each of said shafts, a series of printing drums operated by said toothed wheel, a series of pinions mounted adjacent to said toothed wheels and operated thereby, pins on said pinions, toothed wheels engaging with and driving the printing drums in one direction only, means whereby the pins on the pinions operate the toothed wheel of the drum of next higher value at each complete revolution of the pinion whereby not only is the printing drum operated through the medium of its own shaft but is also operated by the pinion coupled to the shaft which represents the fractions of said printing drum, means for obtaining a record from said printing drum at each transaction.

12. The improved cash registering till, comprising mechanism for indicating the amount of the purchase, a casing having guiding slots, and a window attached to said registering till, a series of endless bands disposed in said casing and adapted to travel past said window, one for each group of coins, each band bearing on one portion thereof figures representing the various values of its coinage, and on another portion thereof a corresponding series of raised printing characters, drums carrying said bands, a spring in one drum for returning the bands to zero, an operating knob attached to each band and adapted to move in the guiding slots in the casing, pawls on said knobs, a ratchet rack engaging with said pawls to prevent return movement thereof, means for releasing said pawls, hinged covers to the tills, and means for pressing a record strip and a printing ribbon on to the raised characters of the bands by the closing movement of said hinged covers.

13. In cash registering tills, the combination of a number of coin storing tubes, means for inserting the coins in said tubes, means for withdrawing the coins from said tubes, mechanism for printing a record strip, and hinged numbers covering the means whereby the coins are inserted and withdrawn coupled together and adapted to actuate the printed strip at the end of each transaction for the purpose of isolating each transaction on the record.

14. In cash registering tills, the combination of a number of coin storing tubes, means for inserting the coins in said tubes, means for withdrawing the coins from said tubes, mechanism for printing record strips, means for showing the amount of the purchase, and hinged members covering means whereby the coins are inserted and withdrawn coupled together and adapted to actuate the recording strips, and adapted to release the device which exhibits the amount of the purchase.

15. The improved cash registering till comprising mechanism for indicating the amount of the purchase, a casing having guiding slots, and an aperture, attached to said registering till, a series of endless bands disposed in said casing and adapted to travel past said aperture, one for each group of coins, each band bearing on a portion thereof figures representing the various values of its coinage, and on another portion thereof a corresponding series of raised printing characters, drums carrying said bands, a spring in one drum for returning the bands to zero, an operating knob attached to each band, and adapted to move in the guiding slots in the casing, pawls on said knobs, a ratchet rack engaging with said pawls to prevent return movement thereof, means for releasing said pawls, a hinged cover to the till, means for pressing a record strip and a printing ribbon on to said raised characters by the closing movement of the hinged cover, and a tablet below the aperture in the casing whereby the assistant can add his signature to the record of each transaction on an extended portion of the record strip passing beneath said aperture.

In witness whereof, I have hereunto signed my name in the presence of two subscribing witnesses.

MAURICE WILLIAM SMITH.

Witnesses:
 HENRY A. PRYOR,
 ROBERT M. SPEARPOINT.